(12) United States Patent
Rameau et al.

(10) Patent No.: US 8,421,798 B2
(45) Date of Patent: Apr. 16, 2013

(54) METHOD OF COMPUTER-AIDED DESIGN OF EDGES CONNECTING FACES OF A MODELED OBJECT

(75) Inventors: Jean-Francois Rameau, Lisses (FR); Joran Maille, Clamart (FR); Pascal Hebrard, Paris (FR)

(73) Assignee: Dassault Systemes, Velizy-Villacoublay, Cedex (FR)

( * ) Notice: Subject to any disclaimer, the term of this patent is extended or adjusted under 35 U.S.C. 154(b) by 696 days.

(21) Appl. No.: 12/673,384

(22) PCT Filed: Aug. 22, 2008

(86) PCT No.: PCT/IB2008/002211
§ 371 (c)(1),
(2), (4) Date: Feb. 12, 2010

(87) PCT Pub. No.: WO2009/027793
PCT Pub. Date: Mar. 5, 2009

(65) Prior Publication Data
US 2011/0282632 A1 Nov. 17, 2011

(30) Foreign Application Priority Data

Aug. 24, 2007 (EP) .................................... 07016640

(51) Int. Cl.
*G06T 15/00* (2006.01)
*G06T 17/00* (2006.01)
*G06T 11/20* (2006.01)
*G06G 7/48* (2006.01)

(52) U.S. Cl.
USPC ................. 345/419; 345/420; 345/442; 703/7

(58) Field of Classification Search ........................ None
See application file for complete search history.

(56) References Cited

U.S. PATENT DOCUMENTS 5,189,626 A * 2/1993 Colburn ......................... 700/182
5,251,160 A 10/1993 Rockwood et al.
(Continued)

FOREIGN PATENT DOCUMENTS

EP 0 649 103 A1 4/1995
EP 1 710 720 A1 10/2006
(Continued)

OTHER PUBLICATIONS

Silvia Ansaldi, Leila De Floriani, and Bianca Falcidieno. 1985. Geometric modeling of solid objects by using a face adjacency graph representation. In Proceedings of the 12th annual conference on Computer graphics and interactive techniques (SIGGRAPH '85). ACM, New York, NY, USA, 131-139.*

(Continued)

*Primary Examiner* — Kee M Tung
*Assistant Examiner* — Zhengxi Liu
(74) *Attorney, Agent, or Firm* — Hamilton, Brook, Smith & Reynolds, P.C.

(57) ABSTRACT

The invention is directed method of computer-aided design of edges connecting faces of a modeled object, the method comprising a step of:—determining (S100-S130) a structure of subsets of faces and edges of specified convex or concave type, by iteratively disconnecting (|S120|) faces connected by edges of one type from a parent subset, whereby said parent subset is decomposed into child subsets comprising either:—a non-connected face; or—faces connected by edges of the other type, in which case edges of said one type are maintained in said child subset, wherein said one type of edges is further alternated at each iteration of disconnecting; and the method further comprising a step of:—processing (S140) the structure from a given parent subset for rounding or filleting the one or more edges connecting child subsets thereof, according to the type of edge as specified in said given parent subset. More generally, the present invention may further be directed to the design of implementation of two distinct technologies for processing features connecting elements a model, in place of design of edges connecting faces of a modelled object.

15 Claims, 13 Drawing Sheets

U.S. PATENT DOCUMENTS

| | | | |
|---|---|---|---|
| 5,615,317 A * | 3/1997 | Freitag | 345/419 |
| 5,982,923 A | 11/1999 | Kim et al. | |
| 6,133,922 A * | 10/2000 | Opitz | 345/420 |
| 2002/0180729 A1* | 12/2002 | Venkataraman et al. | 345/420 |
| 2003/0214503 A1* | 11/2003 | Venkataraman et al. | 345/420 |
| 2007/0027665 A1* | 2/2007 | Maille et al. | 703/6 |
| 2009/0096790 A1* | 4/2009 | Wiedemann et al. | 345/427 |

FOREIGN PATENT DOCUMENTS

| | | |
|---|---|---|
| JP | 07-175843 | 7/1995 |
| JP | 08-016651 | 1/1996 |
| JP | 11-126219 | 5/1999 |
| JP | 11-197993 | 7/1999 |
| JP | 2001-0307111 | 11/2001 |
| JP | 2002-259471 | 9/2002 |
| JP | 2006-294036 | 10/2006 |

OTHER PUBLICATIONS

Cui X, Gao S, Zhou G. An efficient algorithm for recognizing and suppressing blend features. In: CAD'04, Pattaya Beach, Thailand, 2004. p. 24-8.*

Lockett, H. L., & Guenov, M. D. (2005). Graph-based feature recognition for injection moulding based on a mid-surface approach. Computer-Aided Design, 37(2), 251-262.*

Allada, V., et al., "Feature-based Modelling Approaches for Integrated Manufacturing: State-of-the-art Survey and Future Research Directions," *Int. J. Computer Integrated Manufacturing* 8(6):411-440 (1995).

Xu, Z., et al., "Fillet Operations with Recursive Subdivision Surfaces," *Geometric Modelling. Theoretical and Computational Basis Towards Advanced CAD Applications. IFIP TC5/WG5.2 Sixth International Workshop on Geometric Modelling*:269-284 (2001).

Liu, W., et al., "An Adaptive Alogrithm of Automatic Implementing Fillet Operations with Loop Subdivision Surfaces," *Third International Conference on Virtual Reality and its Applications in Industry* 4756:87-97 (2003).

Salomons, O.W., et al., "Review of Research in Feature-Based Design," *Journal of Manufacturing Systems* 12(2):113-132 (1992).

International Search Report from International Application No. PCT/IB2008/002211, Dated: Jan. 26, 2009.

* cited by examiner

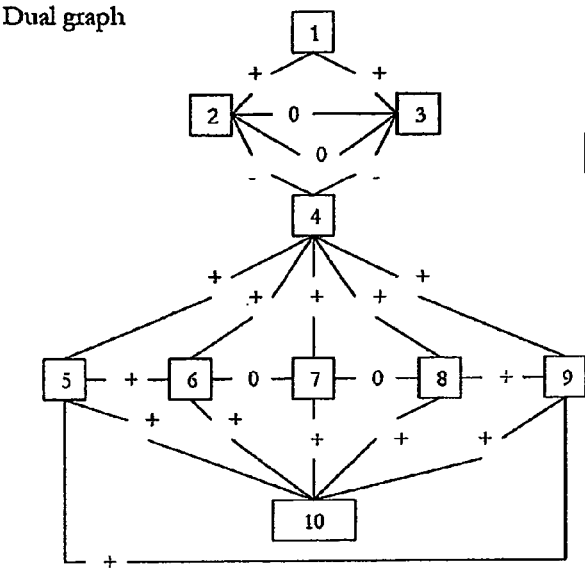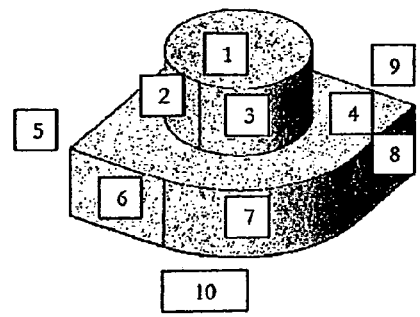
FIG. 5A  FIG. 5B
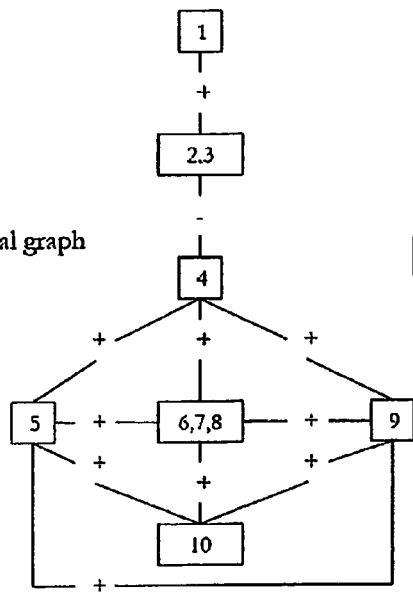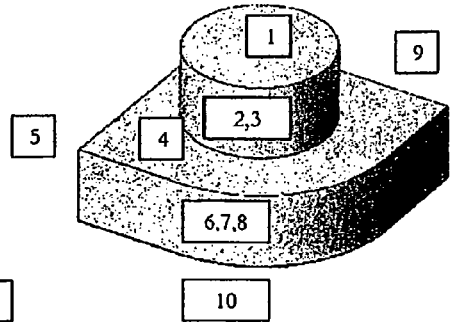
FIG. 6A  FIG. 6B

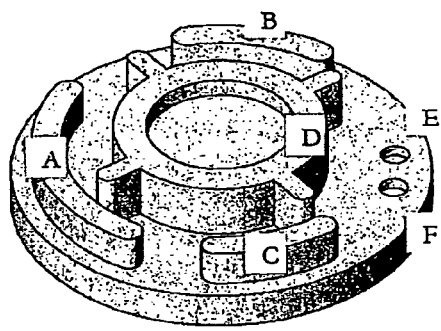
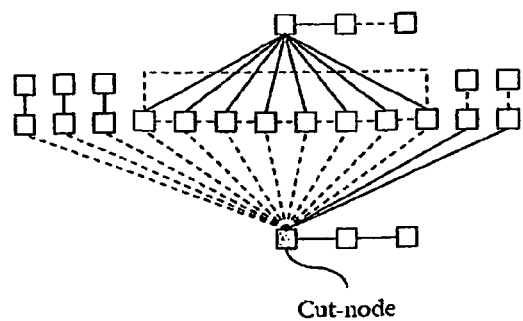
FIG. 8A  FIG. 8B
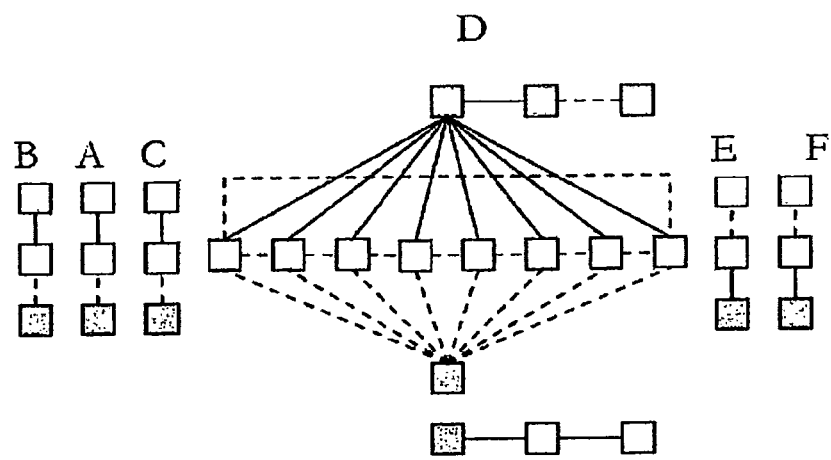
FIG. 8C
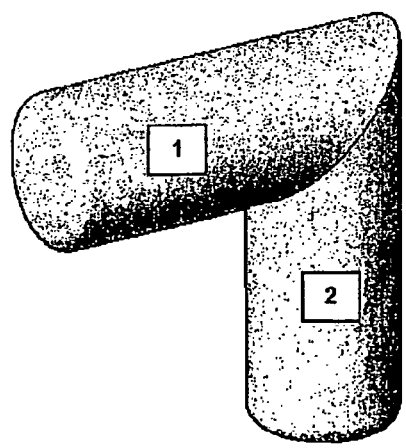
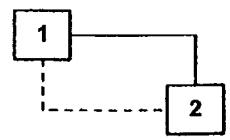
FIG. 9A  FIG. 9B

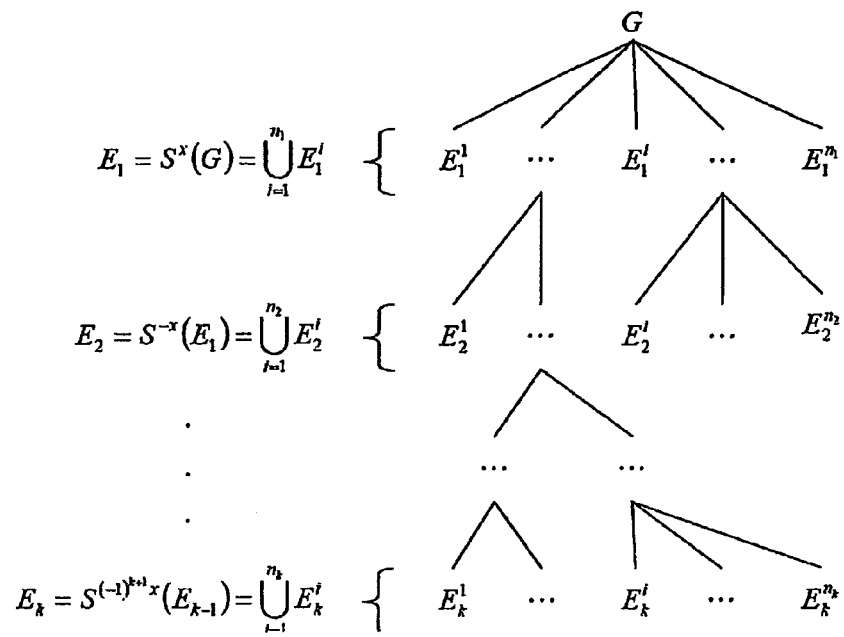
FIG. 10
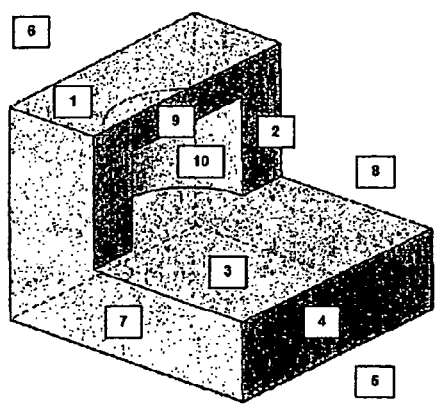
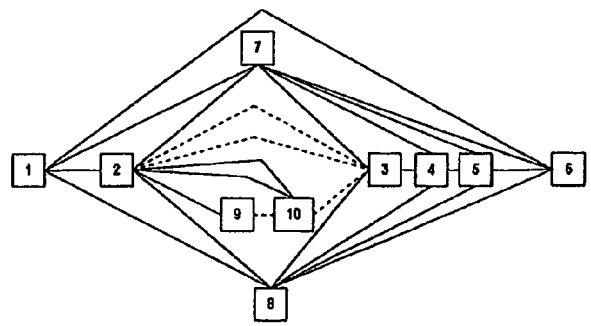
FIG. 11A          FIG. 11B

B overlapping A and C

A overlapping B overlapping C

METHOD OF COMPUTER-AIDED DESIGN OF EDGES CONNECTING FACES OF A MODELED OBJECT

This application is the U.S. National Stage of International Application No. PCT/IB2008/002211, filed Aug. 22, 2008, which designates the U.S., published in English, and claims priority under 35 U.S.C. §§119 or 365(c) to European Application No. 07016640.0, filed Aug. 24, 2007.

FIELD OF THE INVENTION

The invention relates to the field of computers programs and systems, and more specifically to the field of computer-aided design (CAD) and computer-aided manufacturing (CAM) systems.

BACKGROUND OF THE INVENTION

A number of systems and programs are offered on the market for the design of parts or assemblies of parts, such as the one provided by Dassault Systemes under the trademark CATIA. These so-called computer-aided design (CAD) systems allow a user to construct and manipulate complex three dimensional (3D) models of objects or assemblies of objects. CAD systems thus provide a representation of modeled objects using edges or lines, in certain cases with faces. Lines or edges may be represented in various manners, e.g. non-uniform rational B-splines (NURBS). These CAD systems manage parts or assemblies of parts as modeled objects, which are mainly specifications of geometry. In particular, CAD files contain specifications, from which geometry is generated. From geometry, a representation is generated. Specifications, geometry and representation may be stored in a single CAD file or multiple ones. CAD systems include graphic tools for representing the modeled objects to the designers; these tools are dedicated to the display of complex objects—the typical size of a file representing an object in a CAD system extending up to the range of a Mega-byte for part, and an assembly may comprise thousands of parts. A CAD system manages models of objects, which are stored in electronic files.

Designing a mechanical part with a known CAD system can be seen as defining the geometrical shape and dimensions of said part so as to fit functional and manufacturing requirements. Mainly, the resulting shape is a combination of basic features such as pad, pocket, groove, shaft etc. created by the designer. Through complex geometrical and topological computations, the CAD system yields the boundary representation of the solid (mechanical part) as e.g. a closed and oriented surface.

Obviously, modeled objects designed with CAD systems aim at resembling as closely as possible to the final fabricated product, at least for some applications.

For example, in the field of product/part molding, use is made of molds which can be regarded as continuous faces, possibly connected through sharp edges. The real edges—e.g. of the real molds—are however not perfectly sharp edges but rather show slightly rounded or filleted sections. Thus, when such features are neglected in the corresponding theoretical model, the quantity of material needed for molding slightly differs from that expected from the theoretical model. Obviously, such details may be seen as unimportant as long as one focuses on the overall agreement between real and modeled objects. However, this may become of importance when considering mass/continuous production, where the differences between theoretical and real quantity of material necessary for production are substantial.

Additional constraints can be pointed out. For instance, the solid's boundary representation is an input data to design the mold. The boundary representation of the mold is an input data to compute the tool trajectory to machine the mold from a rough stock. In order to optimize material flow, cooling process, and un-molding step, sharp edges are generally not allowed on the mold. For tool path optimization, the faces of the mold must be as canonical as possible (plane, cylinder, sphere, torus, cone).

Therefore, one understands that it is needed to predict as faithfully as possible the features of the final "real" product, should it be for improving feasibility or forecasting. In other words, it is necessary to improve the agreement between modeled and real parts. In this respect, CAD designers sometimes have to replace sharp edges of theoretical molds or products by rounded edges.

To achieve this, the classic modeling approach is to create fillet-like sections (e.g. a radius to apply on concave edges) of round-like sections (radius to apply on convex edges) of product edges, one by one. As illustrated in FIGS. 1A-B, a model product may thus subsequently exhibit fillet-like (hereafter referred to as "fillet") and/or rounded sections (hereafter "rounds").

Designing rounds and fillets for a model product is usually a one-by-one process. Creating rounds and/or fillets according to such a process becomes quickly very complicated when the number of element to model increases. The user has to find a certain order of steps, which may vary according to the modeled object. If not, the rounding or filleting design may fail.

Furthermore, there are situations wherein the complexity of the modeled object (multiplicity of edges, corner areas, etc.) may be an additional source of failure. In particular, modeling rounds or fillet where edges collide (corners, hard zones, etc.) is a torment. To avoid that, substantial time is needed to determine a sequence of creation of the fillets or rounds that "works". All through the design, the user rounds single sharp edges or small groups of sharp edges, thus creating an ordered sequence.

Within some known CAD systems, this sequence is captured by the history based CAD system and replayed after a modification. The "manual" sequence can thus be processed. The history tree of the part includes many round and fillet features ordered according to designer's selections.

On the other end, some automatic blending algorithms are known, as in patent application EP 1 710 720 ("blending" is used in the field as meaning filleting or rounding). Such a method allows for automatic management of edges of a solid part and provides other advantageous features. This method requires preferably a special set of functional surfaces to be selected by the user. Other global blending ("System for blending surfaces in geometric modeling", see patent document U.S. Pat. No. 5,251,160) can blend the whole solid part. In this case, no ordering task is required from the designer but the specification tree includes mostly one "automatic blending" feature only.

Accordingly, although automatic blending algorithms are known, it is believed that the best possible results are often achieved by manual input of an ordered sequence by the user, preferably being very knowledgeable and experienced in this domain. However, as explained above, the designer has to find an ordered sequence of sharp edges that works, which means that a number of sequences may fail to compute the geometry. The designing process is therefore time consuming. In addition, amongst other drawbacks, it turns that different sequences yield different geometrical results. In particular, the obtained geometrical results are not equivalent from the mechanical design point of view. In particular, more or less material is added to or removed from the solid, and machining the final shape is more or less expensive depending on the number of surfaces. A genuine filleting skill is therefore required from the designer to release an industrial result.

This is illustrated in reference to FIGS. 2A and 2B. Rounding and filleting strategy illustrated in FIG. 2A yields a correct result. Here, circled numbers represents steps of a sequence of fillet/round. Edges pointed at by identical step number are processed together. The result of the sequence shown is that canonical surfaces are created as much as possible. The geometry is precisely what would manufacture a machining process using a ball end cutting tool.

Conversely, the strategy illustrated in FIG. 2B is not as good. There are more resulting faces, that is, twenty faces instead of sixteen above. The faces in question are depicted as shaded, in the vicinity of the corresponding edges. In addition, there are less canonical surfaces, there are many sharp end faces, and no simple machining process would yield this geometry.

In this respect, it can be noted that selecting all sharp edges in a same batch process is not realistic because the ordered sequence is out of designer's control and the geometrical result turns out to be unpredictable.

Patent documents listed below are related to the same technical field of the invention.

For example, the patent application "Method for blending edges of a geometric object in a computer-aided design system" (EP 0 649 103) describes an algorithm modifying the boundary representation of the solid part in order to create rounds or fillets on user selected edges. The question of automatic and appropriate ordering is however not addressed.

Patent application "System for blending surfaces in geometric modeling" (U.S. Pat. No. 5,251,160, discussed above) describes an algorithm to blend together a set of primitive solid shapes. These solid shapes are required to be implicitly defined. However, the modeling technology disclosed does not fit some industrial requirements for the following reasons. Only simple objects can be modeled using only implicit equations. Manufactured physical objects, that is, real life objects rather include complex sweep surfaces (airplane wing, thermal engine inlet or outlet port, car "body-in-white" stiffener), draft surfaces for casting and forging industry, free form styling surfaces. Thus, implicit definition of real surfaces is out of reach. They are instead described through explicit functions.

Patent application "Method of computer aided design of a modeled object having several faces" (EP 1 710 720, discussed above), discloses a generic algorithm to modify the boundary representation of a solid in order to provide a drafted or rounded/filleted shape. No ordering algorithm is described.

Next, SolidWorks Corporation, a Dassault Systemes company, has released recently "SolidWorks Intelligent Features Technology" (SWIFT). This set of advanced tools includes a special command to order rounds and fillets when the designer selects a set of edges. Testing various scenarios, the present inventors have concluded that the algorithm used was not designed to satisfy requirements of the mechanical specifications of molding/casting Finally, there remains a need for finding a solution for automatically defining a suitable ordered sequence of processing rounds/fillets, in order to save time in the rounding/filleting design process and improving matching of requirements of the mechanical specifications.

SUMMARY OF THE INVENTION

To solve this problem, the present invention proposes a method of computer-aided design of edges connecting faces of a modeled object, the method comprising a step of:
  determining a structure of subsets of faces and edges of convex type or concave type, by iteratively disconnecting faces connected by edges of one of said convex type or concave type from a parent subset, whereby said parent subset is decomposed into child subsets comprising either:
  a non-connected face; or
  faces connected by edges of the other of said convex type or concave type, in which case edges of said one of said convex type or concave type are maintained in said child subset,
wherein said one of said convex type or concave type of edges is further alternated at each iteration of disconnecting; and
  the method further comprising a step of:
  processing the structure from a given parent subset for rounding or filleting the one or more edges connecting child subsets thereof, according to the type of edge as specified in said given parent subset.

In given embodiments, the process according to the invention may comprise one or more of the following features:
  the step of processing the structure comprises a first-depth scan for processing the structure from said given parent subset;
  the method according to the invention comprises, prior to said step of determining the structure, a step of determining a graph having nodes representing said faces and arcs representing said edges, and at said step of determining the structure, iterative disconnection is performed by iteratively disconnecting said graph into sub-graphs corresponding to respective child subsets in the structure;
  the step of determining said graph further comprises collapsing several nodes into a single node, prior or during disconnection, wherein the collapsed nodes represent: adjacent faces connected by a smooth edge; faces surrounding a singular vertex; or faces linked according to predefined geometrical criteria, possibly user-defined;
  the method according to the invention further comprises, after the step of determining the graph and prior to determining the structure, a step of cut-node separation of the graph determined, resulting in two graphs, wherein said two graphs are handled separately at the step of determining the structure;
  at the step of determining the structure, coupled arcs are taken into account so that they are not separated in different sub-graphs;
  the method according to the invention further comprises, prior to said step of determining the structure, a step of: receiving user-selection of a subset of edges and/or faces, and the step of determining the structure begins at a parent subset reflecting said user-selection;
  the step of processing the structure comprises: displaying to a user said one or more edges connecting child subsets of said given parent subset; receiving user-edition of a displayed edges; processing together said one or more edges, taking into account said user-edition;

at said step of determining the structure, the structure determined is a tree structure capturing a decomposition of said subsets; and at said step of determining the structure, iterative disconnection is performed twice, by beginning with both one of said convex or concave type of edges, and the other type of edges, the method according to the invention further comprising a step of: retaining amongst the tree structures accordingly determined the tree structure the less deep.

More generally, the invention is directed to a method of computer-aided design of implementation of two distinct technologies for processing features connecting elements of a model, the method comprising a step of:

determining a structure of subsets of elements and features of a first type or a second type, by iteratively disconnecting elements connected by features of one of the first or second type from a parent subset, whereby said parent subset is decomposed into child subsets comprising either:

a non-connected element; or elements connected by features of the other of said first or second type, in which case features of said one of the first or second type are maintained in said child subset, wherein said the type of features is further alternated at each iteration of disconnecting; and the method further comprising a step of:

processing the structure from a given parent subset for implementing a first or a second technology for processing one or more features connecting child subsets of said parent subset, according to the type of features specified in said given parent subset.

In an embodiment, said method further comprises a step, concomitant with or subsequent to the step of processing the structure, of implementing said first and second technologies according to a result of the step of processing the structure.

The invention further concerns a computerized system and a computer program product comprising means adapted for implementing the method of the invention.

DESCRIPTION OF THE DRAWINGS

Various embodiments of the invention are now discussed, in reference to the drawings, in which:

FIGS. 5A-B: exemplify a dual graph (5A) and a respective solid part (5B);

FIGS. 6A-B represent a simplified dual graph (6A) and respective solid part (6B) corresponding to FIGS. 5A-B;

FIGS. 8A-C illustrate cut-node separation with respect to a solid part;

FIGS. 9A-B exemplify a solid part having a non discrete and irreducible graph;

FIG. 10 shows a tree structure and related mathematical notations reflecting successive and alternate iterations of a graph extractor operator;

FIGS. 11A-B show the non-trivial solid part of FIG. 1A and corresponding simplified dual graph;

FIGS. 12A-E, represents a tree structure as determined for the solid part of FIG. 11A, according to an embodiment of the invention;

DETAILED DESCRIPTION OF THE INVENTION

The present invention relates to an algorithm for automatically computing a sequence of (sharp) edges prior to rounding and filleting. More generally, it concerns design of how to implement two distinct technologies for processing features connecting elements of a model. In the preferred embodiment, the technologies in question correspond to rounding and filleting processes.

Preferably, it is first iteratively determined a structure of subsets of faces by disconnecting in a subset the faces previously connected through an edge of a given convex or concave type. At each iteration, the type of edges used for removal is alternated. Each subset along the structure will comprise one or more faces, e.g. a subset comprises either a non-connected face or faces connected through edges of the other type than that used for edge removal at this iteration (in that case, all edges in the connected subset are maintained). Hence, connected faces are sequentially disconnected along a well-ordered structure, until completion of the structure determination step. In practice, the structure determination is advantageously implemented through graph disconnection techniques.

Then, in a subsequent step, the structure is processed in a reverse order, e.g. edges connecting child subsets (of faces) are blended according to a type as specified in the parent subset. Thus, a processing step order is provided. The structure determined makes that edges to be processed at a given level are the same type (or as much as possible the same type, as shall be explained). Edges can therefore harmoniously and efficiently be processed together.

An alternate sequence of subsets of edges to be processed is accordingly drawn. Subsets of convex-type edges are for instance processed before processing subsets of concave-type edges along the reversed structure, and vice-versa. In facts, the present inventors have realized that processing alternate subsets of edges of as much as possible the same type dramatically improves the results in practice. Thus, the very key point of the invention is to determine and process an alternate sequence of subsets of edges of as much as possible the same type for rounding or filleting said edges according to their type as specified in the subsets of edges.

The blending sequence provided preserves, in practice, canonicity as much as possible. The resulting sequences which have been tested have proven being the best possible in practice. Using traditional commands and working a long time, a skilled designer would not produce a better shape, according to the numerous tests which have been carried out. Furthermore, symmetrical details of the input part reflect in symmetrical round or fillet surfaces obtained. This allows for improved matching with mechanical specifications of molding/casting and forging.

Figure 3:
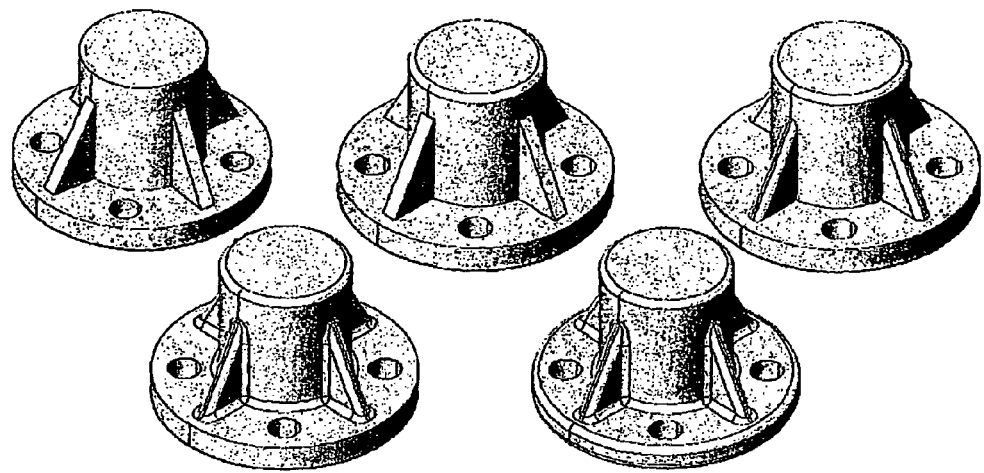
FIG. 3 shows a sequence of edges as processed on the part of FIGS. 2A-B, according to the invention.

As to illustrate this: FIG. 3 represents a sequence as processed by the invention on a typical body part. The sequence reads from top left to bottom right: at each step, new edges are processed until completion is achieved.

This sequence can be used through many ways to enhance the CAD system. For example, the designer may select a set of sharp edges, the system computes an optimal sequence of blend and automatically creates as many round and fillet features as necessary according to this sequence. This way, the designer can navigate and edit features of each round or fillet, for example to change a radius value.

Another way is to display step by step each (set of) sharp edge(s) to be processed together and to let the designer edit the features at each step, e.g. set radius values (a default value is else set to all edges). From step n to step n+1, the system computes the rounds (fillets) corresponding to the sub-skin displayed at step n.

Besides ergonomics, the edge processing sequence provided by the invention (such as illustrated in FIG. 3) offers an efficient way to save canonicity of the resulting geometry. Mainly, cylindrical, conical, spherical or torus-shape surfaces are created, while sharp end or fill surfaces are avoided as much as possible. In addition, the initial symmetry is nicely reflected in the final blend.

The quality of the resulting solid is improved for further use: drawing, offsetting, machining, further design operations etc. The overall quality of production is better because, given a functional mechanical part, two different designers will release the same rounding and filleting strategy. Since the system computes the sequence, the design time is shortened by the time spent to define the (human) ordered sequence of sharp edges. Less CAD skill is required from the designer. CAD training is easier and faster.

In other words: the present invention provides easier and faster training, faster design and better resulting quality.

It is however noted that using a fill surface will be unavoidable in some cases, in particular when processing complex industrial solid parts. This shall be discussed.

Figure 4:
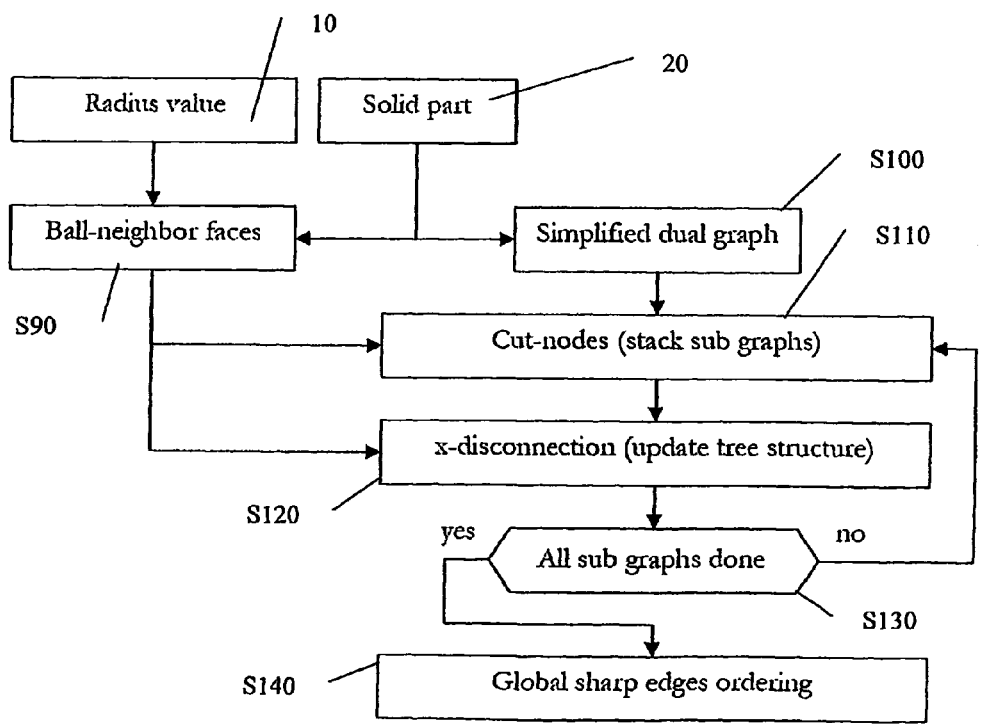
FIG. 4 shows a high-level algorithm, according to an embodiment of the invention.

A high-level algorithm (for implementing the invention in an embodiment) is now described in reference to FIG. 4.

In the embodiment of FIG. 4, the step of determining the structure of subsets may comprises an initial step of creation (S100) of a graph reflecting elements to be processed, for example a simplified dual graph or "dual graph" (for short) that captures the relevant information. The graph obtained reflects faces connectivity through sharp edges and convexity or concavity or sharp edges.

If necessary, a "cut-nodes" step S110 splits the graph into as many components as necessary, so as to allow for separately processing independent details of a body part.

Then, the above graph is disconnected into an alternate sequence of sub-graphs, each of said sub-graphs corresponding to a subset as described above. For example, each connected sub graph is recursively ("x-disconnection step", |S120|) disconnected into alternate convex and concave sub skins.

The three mains steps above preferably create and manage sub graphs through a loop until all sub graphs are done (step S130). The overall step of determining the structure may furthermore update a tree structure capturing sub graphs embeddings. The process ends with homogeneous sub graphs or irreducible heterogeneous sub graphs, whereby edges to be processed subsequently are of the same type or as much as possible the same type.

In this respect, processing the structure in a reverse order may be implemented as part of a standard first depth scan through the tree structure, so as to yield the rounding and filleting sequence (last step S140).

Possibly, an additional "ball-neighbor faces" step (or |S90|) is to take a radius value |10| into account so that non adjacent faces or complex vertices remain in the same sub graph. This way, small details like tiny faces, small notches, thin walls as well as high order vertices are correctly managed.

Each of the main steps S100-140 above is described in details in the following.

To start with, it is now focused on the step of building the dual graph (step S100 in FIG. 4).

An input of the algorithm is typically the boundary representation of the solid part |20|, interpreted as a topological graph. By definition, a topological graph involves vertices, edges and faces connected together in such a way that an edge is shared by at most two faces, thus defining a two dimensional manifold. Then, the dual graph of this topological graph is computed. By definition, the nodes of the dual graph are the faces of the topological graph. Furthermore, for each edge shared by two faces of the topological graph, there is an arc connecting the corresponding nodes of the dual graph.

Arcs of the dual graph are preferably labeled in order to capture sharpness, smoothness and convexity of topological edges, which will be later useful. Convex sharp edges are for example labeled "+1", concave sharp edges are labeled "−1", and smooth edges are labeled "0".

The dual graph is further preferably simplified as follows. The simplified dual graph is computed from the dual graph by collapsing nodes connected by a "0" arc. That is, a node of the simplified dual graph is a set of adjacent faces connected by smooth edges. This is advantageous as smooth edges do not need being processed. Consequently, only relevant information to the present purpose can be captured in the simplified dual graph: sharpness, convexity and adjacency. Differences between said graphs is exemplified in FIGS. 5A-B and 6A-B, showing: a dual graph (5A), the corresponding solid part (5B), and the resulting simplified dual graph (6A) with its corresponding simplified solid part (6B).

Figures 1A, 1B:
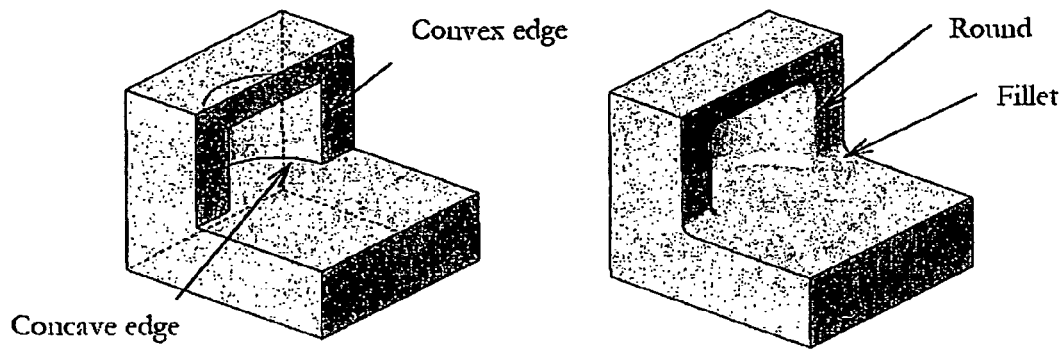
FIG. 1A is an exemplified display of a show a non-trivial solid part having convex and concave edges.
FIG. 1B illustrates round/fillet sections as obtained from FIG. 1A.
Figure 2A:
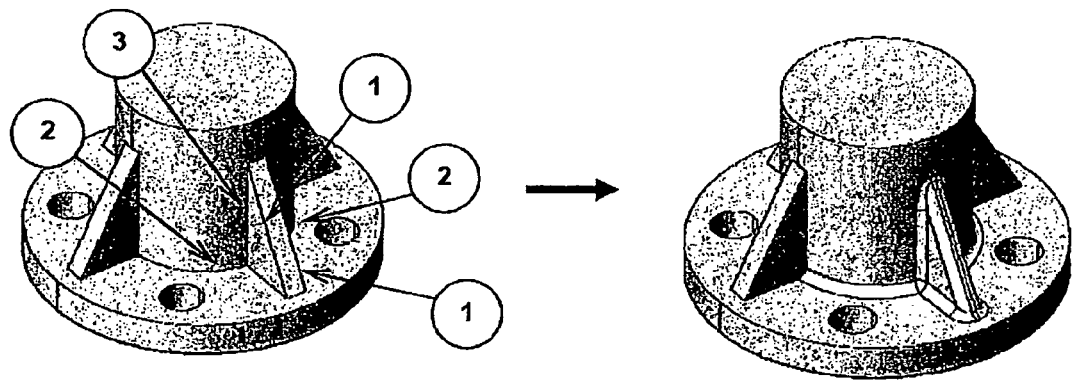
FIGS. 2A and 2B illustrate two sequences of processing round/fillet on a different body part, resulting in different geometries.
Figure 2B:
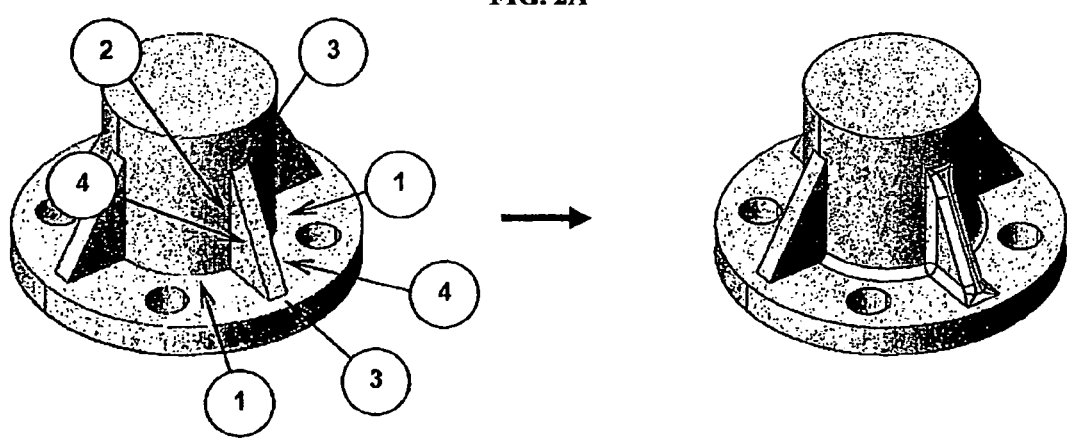

In each of the drawings of FIGS. 5A-6B, the faces numbered (in squares, as to distinguish from previous circled step numbers of FIG. 2) are delimited by edges. Said faces have corresponding nodes in the corresponding graphs.

In the dual graph of the solid part illustrated in FIG. 5A, one may notice two smooth edges connecting cylindrical faces and two more smooth edges connecting the round surface to vertical sides of the bloc. This yields arcs labeled "0" in the corresponding graph. In contrast, arcs "+" or "−" denote sharp edges.

Illustrated in FIG. 6A, the simplified dual graph where smooth skins appear as a single node. Consequently, arcs labeled "0" have disappeared. A corresponding solid part in depicted in FIG. 6B, reflecting the simplified graph obtained. For instance: smooth skins 6, 7, 8 appear as a single face. Accordingly, only the relevant information is retained for optimizing subsequent process.

To summarize, the sequence of steps for building the simplified dual graph is the following: a boundary representation |20| of the solid part is translated into the topological graph. The dual graph is then computed from its topological counterpart and subsequently simplified.

As noted above, the simplified dual graph is still denoted by "dual graph" in the following. Furthermore, in order to avoid confusion between topological and dual graphs, words "face", "edge" and "vertex" will be used preferably when dealing with the topological graph, "node" and "arc" words are used when dealing with the dual graph.

The step of cut-node separation (S110 in FIG. 4) is now discussed in reference to FIGS. 7A-D.

Figure 7A:
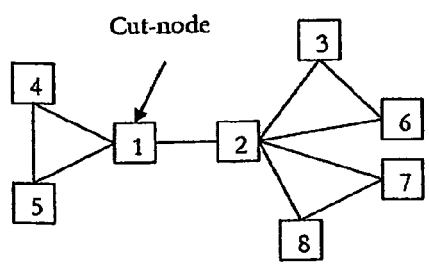
FIGS. 7A-D: exemplify cut-node separation in a graph.
Figure 7B:
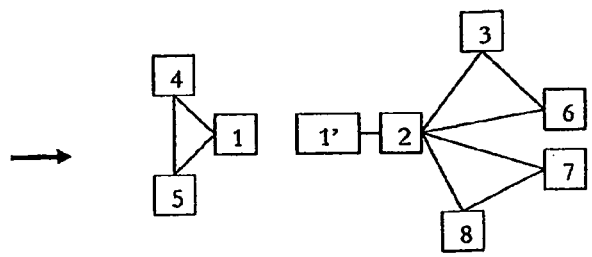
Figure 7C:
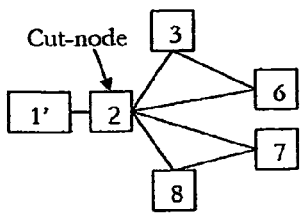
Figure 7D:
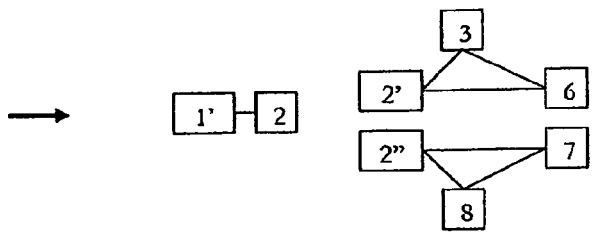

By definition, removing a "cut-node" (and its incident arcs) from a graph disconnects the graph into at least one more component. In the example of FIG. 7A, removing node 1 separates the connected graph into two components (FIG. 7B). Removing then node 2 (FIG. 7C) results in three components (FIG. 7D). In contrast, removing node 3 will not separate the graph.

In the context of the present embodiment, separating the graph through a cut-node is to duplicate the cut-node in each resulting component, as illustrated in FIGS. 7A-D. The cut-node separation is first performed on the dual graph. Incidentally, the algorithm here does not need being recursive as a cut-node separation does not create a new cut-node. Furthermore, the resulting components do not depend on the order the cut-nodes are managed. Given the initial connected dual graph, the full cut-nodes process yields a set of cut-node-less connected sub-graphs. Though not required, such a step allows for recognizing separate features on the solid's boundary, which can thus be handled separately.

A typical example is a plate equipped with protrusions denoted by A, B, C, D and holes E, F, as illustrated in FIG. 8A. A corresponding dual graph is shown in FIG. 8B (wherein edge sharpness reflect in either solid or dashed arcs), before separation. Making the cut-node where indicated in FIG. 8B (the cut-node is the upper face of the plate) results in the set of graphs of FIG. 8C. Hence, separate features yields as many sub graphs. Notice that, in the example of FIG. 8, further cutting is possible.

As cut-node separation allows for independent features to be handled separately, the core method of the invention may be applied to each of the separated graphs. In particular, the graph disconnection to be discussed next will preferably apply to each graphs resulting from cut-node separation.

The following aims at explaining how practically achieving iterative disconnection of connected faces for determining a structure of subsets of faces and edges having specified convex or concave type. At each iteration, disconnection removes edges of a given type and thereby decomposes a parent subset into child subsets. The type of edge used alternates at each iteration. Said subsets are representative of either a non-connected face or faces connected by edges of the other type than that used for disconnection. In the latter situation, edges of the type used for removal are yet maintained in said child subset, which allows for alternate decomposition.

In the presently discussed embodiment, disconnection of connected faces is implemented through graph disconnection techniques. As will be explained, a graph is disconnected into components which are captured in a tree structure.

In this respect, given a simplified dual graph A, graph disconnection will advantageously be achieved via a graph separator, that is, an operator $S^x$, where $x \in \{-,+\}$. It provides a disconnected sub graph $S^x(A)$ from a graph A as follows:

1. Remove all arcs of A with label x, yielding graph Ã.
2. Add to graph Ã all arcs of graph A labeled x and linking nodes inside the same connected x component of Ã. This yields graph $S^x(A)$.

If, at first step, there is no arc with label x, then $S^x(A)=A$. If graph A includes only x labeled arcs, then $S^x(A)$ includes only non-connected (or isolated) nodes. This way, a structure is obtained wherein a parent subset is decomposed into child subsets being non-connected nodes, representing faces.

Note that the step 2. above does not change the number of connected components of Ã since each additional arc links two nodes within the same connected component. This way, a structure is obtained wherein a child subset (a connected component of Ã) wherein edges of the type used for removal are maintained.

As it will be detailed in the following, another key feature is to remove edges of convex or concave type alternately from the subsets of faces and edges. In other words, the type of edges removed is alternated at each iteration. In the present embodiment, this is achieved by running alternate iterations of separator $S^x$, that is $S^x(A)$, $S^{-x}(S^x(A))$, $S^x(S^{-x}(S^x(A)))$, etc. until a stationary behavior is obtained. For this purpose, the main properties of $S^x$ are discussed now.

Let $E_0=A$, $E_1=S^x(A)$, $E_2=S^{-x}(S^x(A))$ etc. be the alternate structure of separated graphs: $E_i$, wherein i=1, 2, 3, . . . , that is: $E_i = S^{(-1)^{i+1}x}(E_{i-1})$. Obviously, there are at most two independent lines of iterations, depending on the choice x=+ or x=−. This point is discussed later.

As to monotony: by definition, $S^x$ extracts a sub graph from a given graph by removing arcs and maintaining nodes unchanged. So the sets of nodes and arcs of $S^x(B)$ are included in the sets of nodes and arcs of B. This defines an inclusion-decreasing sequence of graphs:

$A=E_0 \supset E_1 \supset \ldots \supset E_i \supset E_{i+1} \supset \ldots$ .

Regarding now convergence, the decreasing sequence of graphs above is bounded from below by the discrete graph (that is, made of nodes only but no arc), so there exists a smallest graph. In other words, there exist a smallest integer m such that $A=E_0 \supset E_1 \supset \ldots \supset E_i \supset E_{i+1} \supset \ldots \supset E_m = E_{m+1} = \ldots$ . That is to say iterating alternatively $S^x$ and $S^{+x}$ yields an imbedded and stationary sequence of graphs. Most of the time, the constant graph is a discrete graph. Nevertheless, some industrial scenarios of body parts may lead to non discrete constant graphs, as discussed below.

By definition, a graph B is considered irreducible here if $S^+(B)=S^-(B)=B$. The dual graph of the solid depicted in FIG. 9A is an example of a non discrete and irreducible graph because of a sharp edge that is both convex and concave. FIG. 9B is the corresponding graph.

Furthermore, as applying $S^x$ sequentially yields the same graph: $S^x(S^x(B))=S^x(B)$ for any dual graph B, $S^x$ can be considered as a projector.

How successive and alternate iterations of $S^x$ and $S^{+x}$ splits initial graph into connected components is preferably captured through a tree structure. Each node is a connected graph and its child nodes are connected components obtained by $S^x$ or $S^{+x}$. This way, one obtains tree structure capturing a decomposition of subsets of faces into child subsets.

For example, and in reference to FIG. 10, root node G is the initial graph, leaf nodes are connected irreducible constant graphs. As represented in the set of equations and illustration represented in FIG. 10, notation $$E_k = S^{(-1)^{k+1}x}(E_{k-1}) = \bigcup_{k=1}^{n_k} E_k^i$$

encompasses that $E_k$ is the k-th separation of initial graph G and that $E_k$ $n_k$ connected components $E_k^i$, where i=1, . . . $n_k$. Connected components at iteration k are related to connected components of iteration k−1 by canonical injection of graphs. A node with only one child node means that the iteration does not split the connected component. Such a node is typically removed from the tree without loss of information.

Preferably, the step of processing the structure in a reverse order is carried out as part of a depth-first scan process, which is discussed now. Depth-first scan is an algorithm for traversing a tree, tree structure, or graph. Grossly, this algorithm starts at a root and explores as far as possible along each branch before backtracking. The scan progresses by expanding the first child node of a search tree and goes deeper until a goal (e.g. node without children) is found. Then the scan process returns to the last node for which exploration was not completed.

In the present embodiment, the above tree structure is scanned through a classical depth-first algorithm. A recursive function (here called DepthFirstScan(.)) sets a sequence number to each non leaf node of the tree through variable i, done by instruction SequenceNumber(x):=i below. This defines a blending sequence, as explained in the following.

```
DepthFirstScan(x)
    if node x is a non leaf node then
        for all child y nodes of x do begin
            DepthFirstScan(y)
        end for
        i:= i + 1
        SequenceNumber (x):= i
    end if
```

In other words, using DepthFirstScan(.) function is to initialize i:=0 and call DepthFirstScan(.) on the root node of the tree.

Next, the filleting strategy is computed by depth-first traversing the tree structure provided by the separator iterations, as described above. The algorithm is illustrated by a non trivial example shown in FIGS. 11A-B.

Here again, dotted arcs of dual graph stand for concave edges while solid arcs of dual graph stand for convex edges. As in previous figures, faces are numbered in squares (here from 1 to 10). The corresponding graph G (FIG. 11B) does not include any cut-node, for the sake of simplicity.

Figure 12:
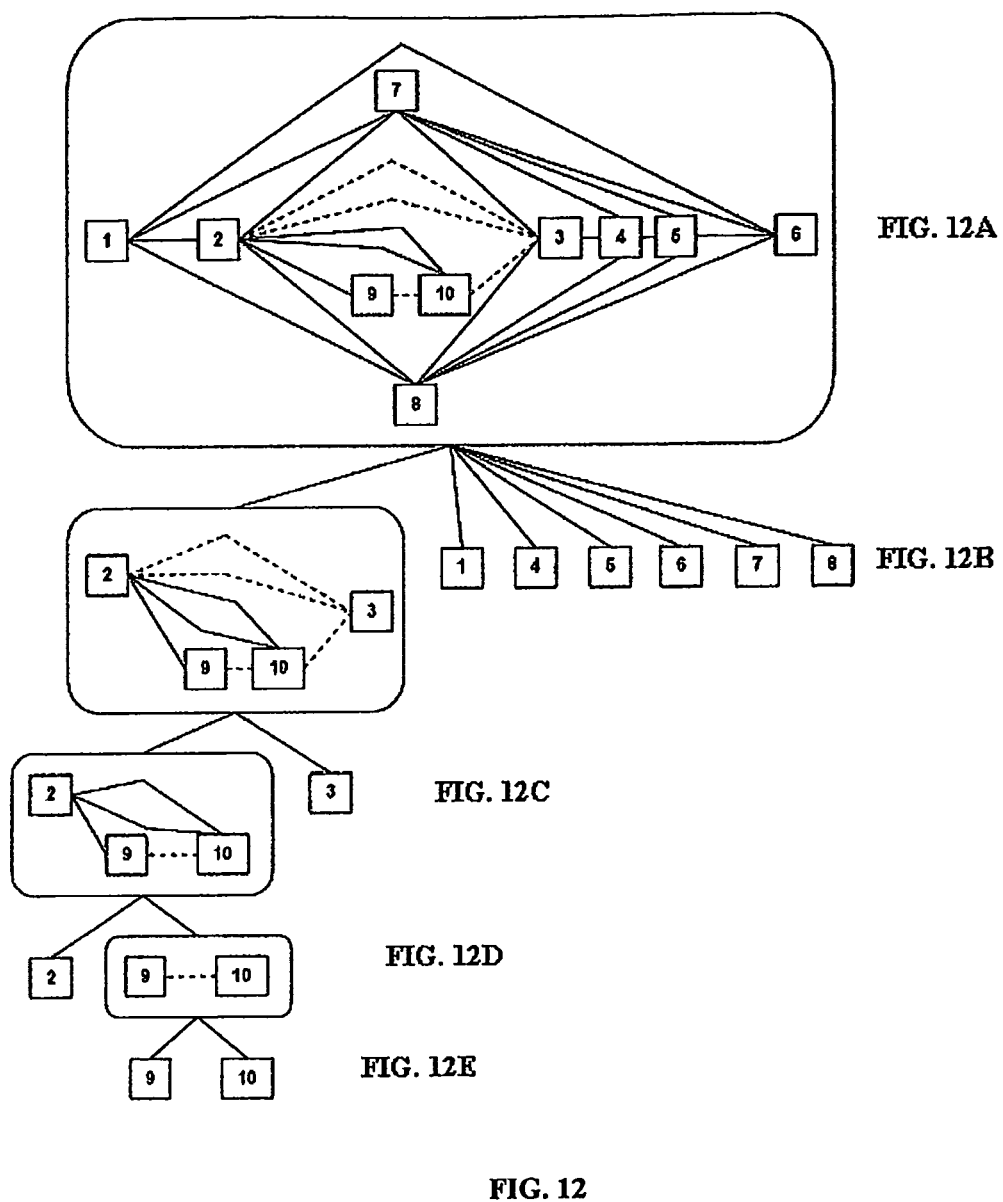
FIG. 12, including

Iterative graph separation behaves as illustrated in FIG. 12 (including FIGS. 12A-E)).

First, looking at FIG. 11B, one may notice that $S^-(G)=G$, where G is the top node, FIG. 12A, corresponding to the graph of FIG. 11B. G can be considered as an initial parent subset of faces.

Applying operator $S^+$ splits the graph G into seven connected components, that is, connected to upper-level G, as shown in FIG. 12B. While applying $S^+$ generally removes solid arcs (convex edges) of the periphery, it can be pointed out that solid arcs corresponding to the nested connected leftmost component are maintained. Accordingly, the leftmost connected component of graph $S^+(G)$ corresponds to a child subset comprising faces connected by concave edges (dotted arcs) wherein edges of same type as those removed at the periphery are maintained. The other six components are isolated faces 1, 4, 5, 6, 7, and 8.

Then, $S^-(S^+(G))$ yields the graph of FIG. 12C, that is, $S^-$ splits the leftmost connected component of graph $S^+(G)$ into two connected components. This time, concave edges of the periphery have been removed, leading to the component 2, 9, 10 on the one hand and to the face 3 on the other hand.

The process continues, alternating each time the type of edges removed until achieving $S^-(S^+(S^-(S^+(G))))$, which is depicted at the level of FIG. 12E. The last graph corresponds to a discrete constant graph.

Thus, a tree structure is built which captures successive decompositions of subsets of faces.

Next, another key feature of the invention is to process the previous structure in a reverse order for the blending sequence (i.e. step S140 in FIG. 4). In particular, the previous structure is processed from a given parent subset for filleting/rounding edges connecting child subsets thereof. Blending is carried out according to the type of edge specified in said given parent subset. Implementing this scheme at any level (node) allows for edges of same type to be processed together, assuming that edges of lower levels in the tree have already been processed. Obviously, the process starts preferably from lowest parent subsets, so as to yield a consistent blending sequence. Yet, when a lowest parent subset contains irreducible heterogeneous edges, it might turn advantageous implementing a specific (like a fill) or standard blend for that lowest subset and start the processing sequence at an upper node.

Figure 13:
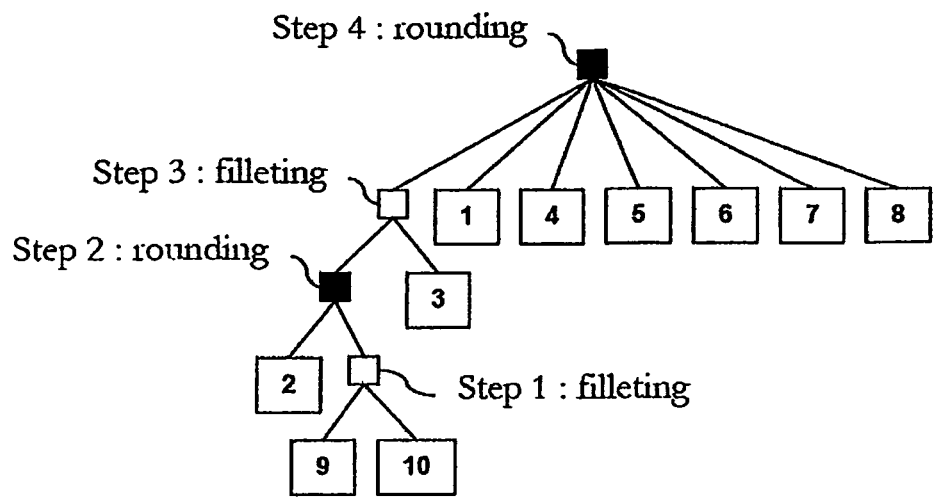
FIG. 13: illustrates a compact version of FIG. 12, with non-leaf nodes tagged according to a filleting/rounding ordered sequence as processed.

Processing the tree structure in a reverse order is now described in reference to FIG. 13. FIG. 13 can be regarded as a compact version of the tree structure of FIG. 12, as no graph is drawn for non leaf nodes. In FIG. 13, non-leaf nodes are tagged according to the filleting/rounding ordered sequence yielded by the depth first traversal process.

Implementing said depth first traversal in the tree of FIG. 12 yields the following rounding/filleting steps, which reads in the compact version of FIG. 13. In particular, referring to FIG. 13, these steps are:

Step 1: fillet the concave internal sharp edge of the skin including faces 9 and 10.

Step 2: round the convex sharp edges shared by face 2 and the skin including faces 9 and 10.

Step 3: fillet the sharp concave edges shared by face 3 and the skin including faces 2, 9 and 10.

Step 4: round all convex internal sharp edges shared by the skin including faces 1, 4, 5, 6, 7, 8 and the sharp edges shared by the said skin and the skin including faces 2, 3, 9 and 10.

Figure 14:
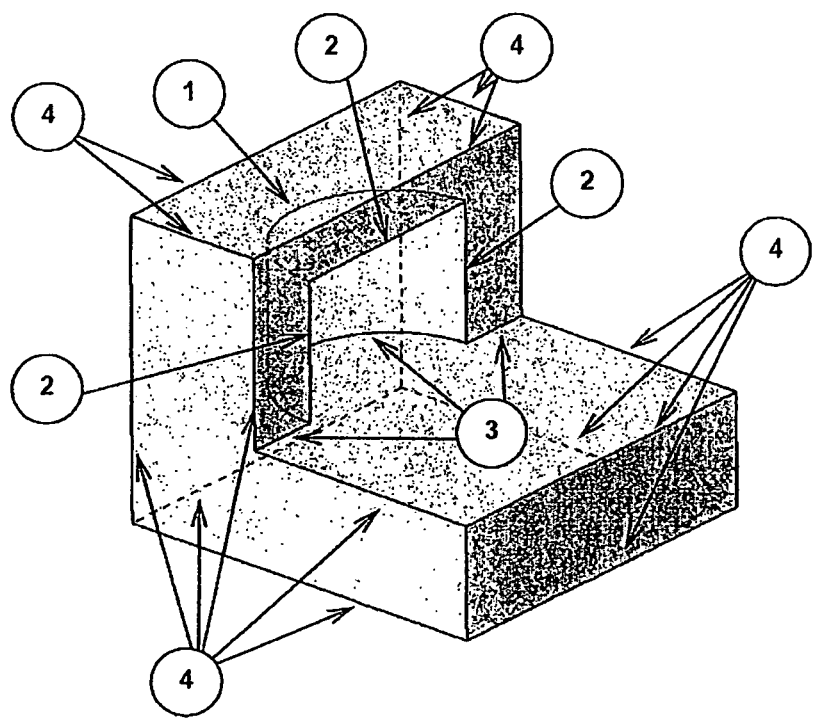
FIG. 14: represents the sequence steps of FIG. 13 in relation to the solid part of FIG. 11A.

This yields the sequence as represented in FIG. 14. The sequence steps are denoted by numbers imbedded in circles. Accordingly, an ordering of the blending sequence is provided. Edges pointed at by same step number are the same type and processed together, yielding improved compactness of the process.

Figure 15:
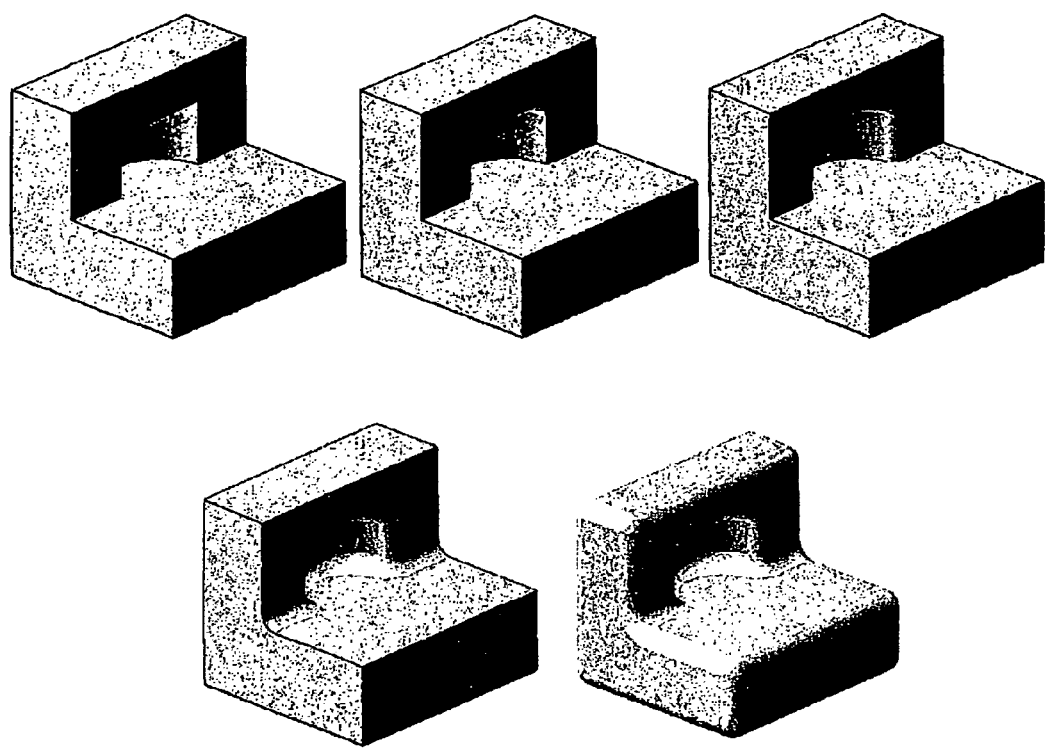
FIG. 15: shows the solid part of FIG. 11A as processed after steps of the sequence of FIGS. 13-14.

Blending the edges according to the sequence of FIG. 14 is represented step-by-step in the sequence of FIG. 15, reading from top-left to bottom-right. Here, the nth body part illustrated corresponds to the part as after processing step n−1 of the sequence of FIG. 14. First element represented is the initial part. The second element is the part as after filleting the concave internal sharp edge of the skin including faces 9 and 10, etc.

As can be seen (especially in second row), processing the structure interpreted in the reverse order allows for alternately rounding or filleting subsets of sharp edges together.

The core of the present invention has been discussed in reference to a detailed embodiment. Next, it is discussed side problems which can also be dealt with in the context of the present invention.

A first point concerns difficulties related to topology. Difficult topology leads to difficult geometry. Generic topology is defined as follows: each vertex of the topological graph is shared by at most three faces. Difficult topology is, by definition, "non generic": a vertex shared by more than three faces always leads to a difficult geometry. Nave solution of successive overlapping round and fillet surfaces may provide unstable or unsatisfactory shape. For this reason, a "fill surface" may sometimes be required. Operators are known in the art which enable such surface creation. This fill surface must connect all faces incident to the singular vertex in one shot.

The logical graph disconnection as described so far ignores the complexity of vertices and may yield strategies sometimes not the most suitable, depending on the vertices complexity.

For this reason, in the present context, faces surrounding a singular vertex are preferably gathered so that they are never separated by further disconnection. Thus, the present method may adjoin a step of collapsing nodes of the dual graph representing faces surrounding a singular vertex into a single node, prior to disconnection.

In particular, a singular vertex analysis (as known in the art) may be implemented to detect faces to be managed altogether. Consequently, nodes of the dual graph are gathered, yielding convenient tree structures.

Next, there are situations where even an "easy" topology may lead to difficult geometry. So far, the rounding and filleting strategy disclosed is obtained through a pure logical process. No geometrical computation is performed. So far, the method according to the invention allows for nicely solving difficulties if the radius value used for fillet/round is "not too large" with respect to order of magnitude of mechanical part details. In this respect, another aspect of the invention discussed here is to involve geometrical criteria into the logical management described so far. It may happen that a tiny face leads to a topological separation (through cut-node or disconnection) in such a way that separate fillets or rounds do not provide the expected result.

Figure 16:
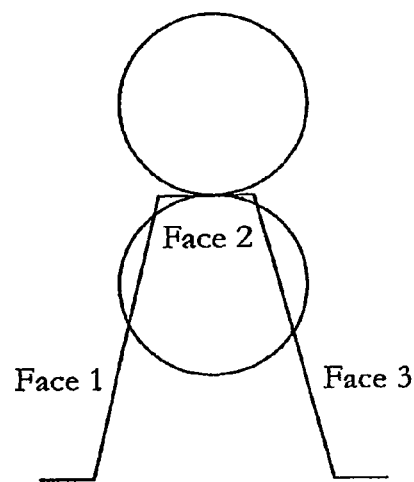
FIG. 16: exemplifies lateral faces of wall to be rounded.

In the example of FIG. 16, given a large radius value of the virtual tool represented (double-ball), lateral faces 1 and 3 of the thin wall cannot be rounded separately because a first round, while removing face 2, would totally remove the edge of second round.

This fact can be captured as follows: one may implement a double ball whose radius is the round/fillet radius. Once located on top of the wall, and if colliding two of its adjacent faces at the same time occurs, the algorithm remembers that faces 1, 2 and 3 must be treated together, through a tri-tangent round in the example of FIG. 16. Consequently, they must not be spread in separate components and this fact is taken into account in the logical process. Thus, the method may adjoin a step of collapsing nodes of the dual graph representing faces which are linked according to predefined geometrical criteria (possibly user-defined), during the disconnection process.

Conversely, if the radius value is small enough, there is no collision, which allows further decomposition. Formal definitions can be contemplated to make this more explicit.

In some extreme cases, it may happen that no disconnection strategy turns to be compliant with the ball-neighbouring analysis. In this case, the disconnection algorithm is adapted to take into account coupled arcs so that they are not separated in different components.

A next point relates to starting iterations with either $S^+$ or $S^-$. Clearly, in some cases, two strategies can be computed, depending on the first separation carried out through $S^+$ or $S^-$. The best output should preferably save canonicity of the resulting surfaces, notwithstanding complex situations. Non canonical surfaces are created when round and fillet surfaces overlap each other iteratively: a round connects two faces, a fillet connects this round with another surface, and a round overlaps this fillet surface while connecting other faces.

Figure 17A:
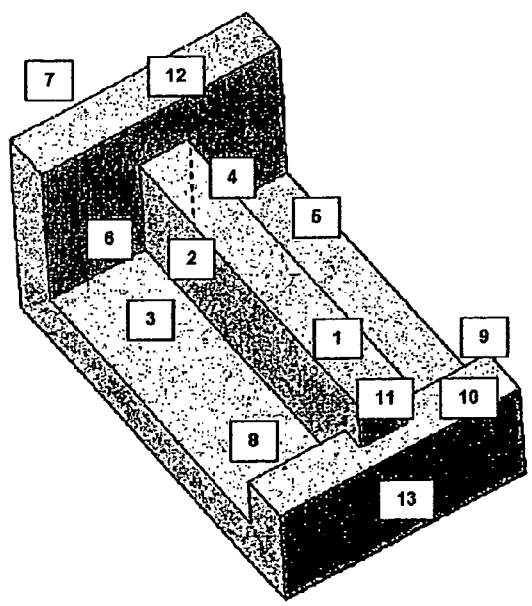
FIGS. 17A-f: illustrate strategies of minimization of blend overlaps.
Figure 17B:
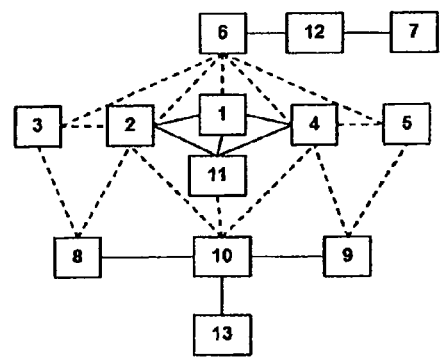

In this regard, present inventors have furthermore realized that the risk to run into this overlapping is minimized by choosing the flattest (less deep) tree structure. Illustrated in FIG. 17A-B, a solid and corresponding dual graph yielding two strategies (tree structures) having different depths.

Figure 17C:
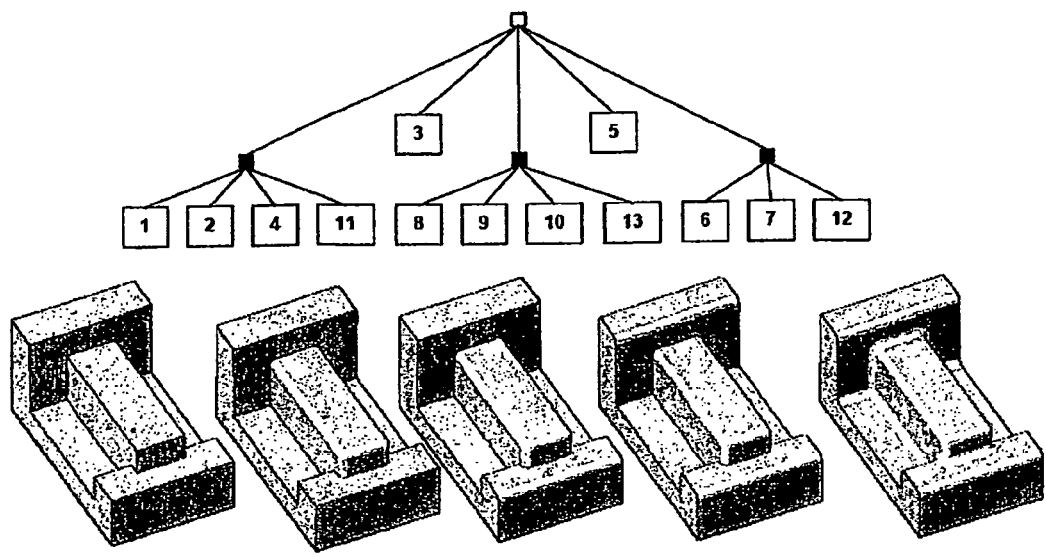
Figure 17D:
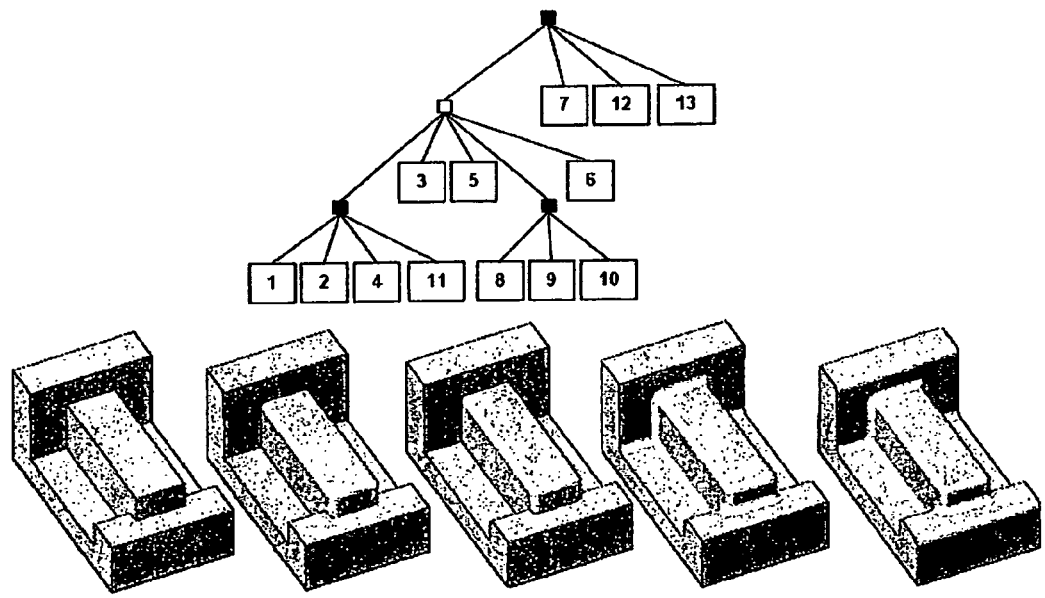

Starting iterations with $S^-$ yields the blending sequence illustrated in FIG. 17C, together with corresponding tree structure. Starting iterations with $S^+$ yields the sequence and corresponding tree structure shown in FIG. 17D.

Clearly, the second sequence is deeper than the first one. It exhibits three arcs from deepest leaf node up to the root node instead of two. As illustrated in FIG. 17F, increasing the radius value in the latter situation (starting with $S^+$) causes the very last round A to overlap the previous fillet B which itself overlaps the previous round C.

Figure 17E:
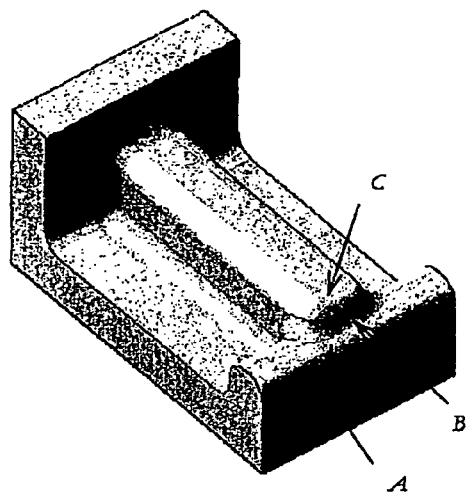
Figure 17F:
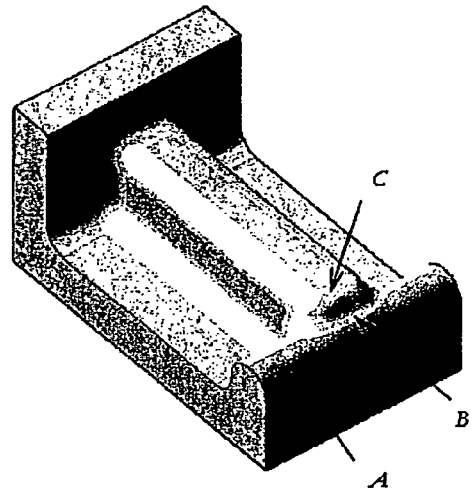

Conversely, the flatter structure (starting with $S^-$) avoids this phenomenon since the very last fillet B overlaps rounds A and C, as illustrated in FIG. 17E. In addition, notice strategy $S^-$ first provides a cylindrical round A.

In contrast, strategy $S^+$ first computes round A through a non canonical surface.

In this respect, given a dual graph G, only two situations can occur. First situation: there exists $x \in \{-,+\}$ such that $S^x(G)=G$. Then the only possibility is to start iterations with $S^{+x}$ and there is no alternative. Second situation: there exist no $x \in \{-,+\}$ such that $S^x(G)=G$, which means that iterations may start with either $S^+$ or $S^-$. Since it is hardly possible to anticipate the depth of each strategy, they are preferably both investigated. Then the deepest structure is discarded.

When two strategies provide tree structures featuring the same depth, they are for instance considered being equivalent.

Figure 18:
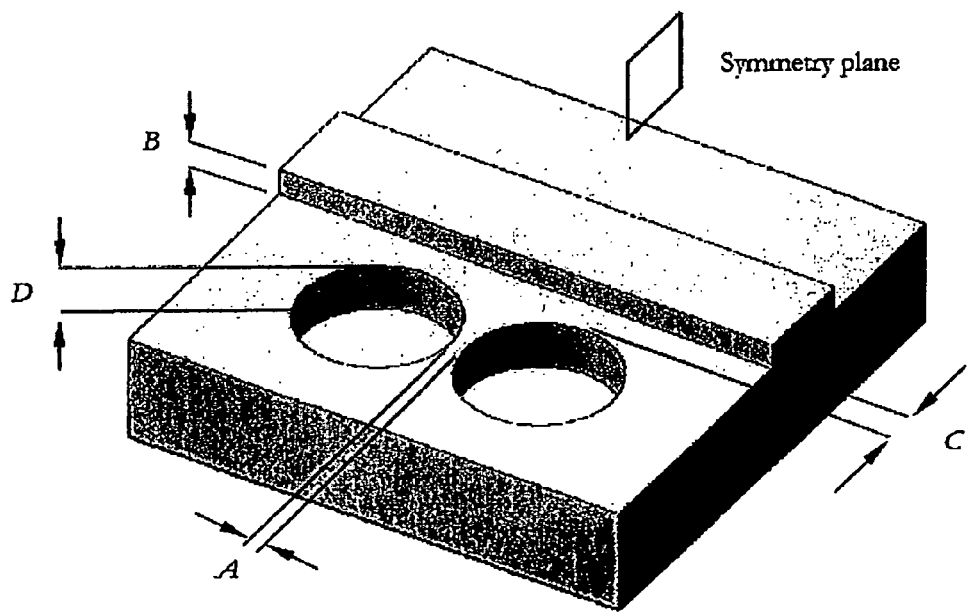
FIG. 18: shows still another part used for a test case.

Next, a test case is discussed. For this purpose, a part is designed to feature rounding and filleting difficulties while remaining as simple as possible. Said part is represented in FIG. 18. It includes three basic features: one linear extrusion and two cylindrical pockets. These basic features are dimensioned and positioned in such a way that round and fillet surfaces unavoidably overlap.

Key dimensions and values used for this test case are listed in the tables below. Other dimensions are less relevant provided they approximately yield the same shape and save the symmetry.

TABLE 1

Dimension of the test part

| Dimension name | Numerical value | Comment |
| --- | --- | --- |
| A | 3 mm | Distance separating cylindrical pockets |
| B | 5 mm | Step height |
| C | 7 mm | Distance between step and cylindrical pockets |
| D | 9 mm | Cylindrical pockets depth |

Test protocol is to round and fillet this test part excluding the bottom face and using different radius values (reported in the table below). The lowest value is an easy case while the highest value is the difficult case.

TABLE 2

Radius values used for the test

Figures 19A, 19B, 19C:
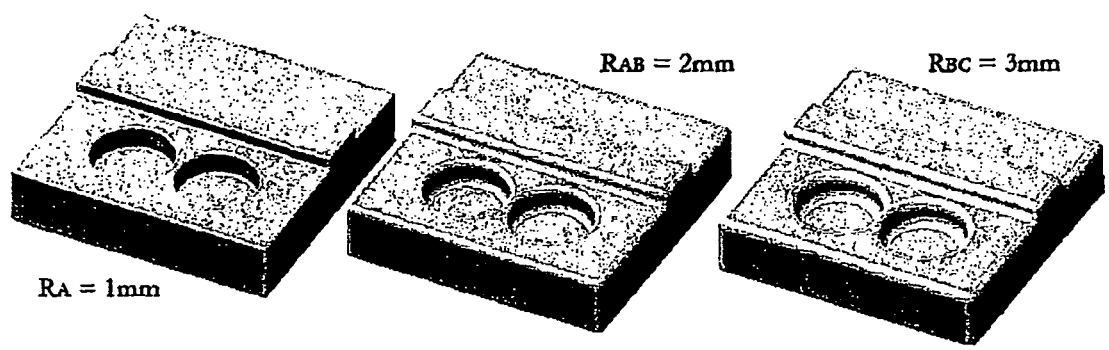
FIGS. 19A-E: depict results of the test case of FIG. 18.

| Radius name | Range | Comment |
| --- | --- | --- |
| $R_A = 1$ mm | $0 < R_A < A/2$ | Easy test case: no overlapping: see FIG. 19A |
| $R_{AB} = 2$ mm | $A/2 < R_{AB} < B/2$ | Round overlapping between pockets: see FIG. 19B |
| $R_{BC} = 3$ mm | $B/2 < R_{BC} < C/2$ | Same as above, plus round and fillet overlapping along step: see FIG. 19C |

TABLE 2-continued

Radius values used for the test

Figures 19D, 19E:
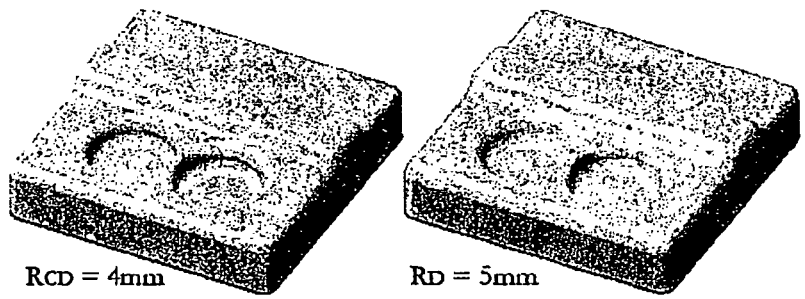

| Radius name | Range | Comment |
|---|---|---|
| $R_{CD}$ = 4 mm | $C/2 < R_{CD} < D/2$ | Same as above, plus pocket round overlapping step fillet: see FIG. 19D |
| $R_D$ = 5 mm | $D/2 < R_D < A/2$ | Same as above, plus round and fillet overlapping within each pocket: see FIG. 19D |

Results as computed according to the present embodiment of the invention for each radius value are illustrated in FIGS. 19A-E. Inspection of said figures show that the results obtained are best possible in the following meaning: a skilled designer using basic round and fillet commands would not provide a better shape in terms of canonicity of resulting surfaces and curvature radius value. Referring back to FIG. 18, test part features a symmetry plane so that symmetry of the result can be checked FIGS. 19A-E. The symmetry plane is perpendicular to the linear extrusion and located between cylindrical pockets.

Although the method and routines described herein above are described in a naïve manner, for the sake of pedagogy, it is obvious that improvements can be contemplated with respect to algorithm efficiency considerations. In particular, rounding and filleting processes can be accelerated. To achieve this, one may involve a (set of) face(s) earlier than what is scheduled by the decomposition tree during the fillet/rounding process. For example, if a face is linked to a subset of faces to be processed through sharp edges featuring the same convexity and if said linked face is not linked to any other faces than those of said subset, then the face in question can be involved together with the subset to be processed. Such an acceleration strategy avoids many useless trimming computations, making the algorithm faster and more reliable.

Incidentally, although graph techniques offer a very convenient way to manage a structure as determined and processed according to the invention, other techniques could be contemplated.

All the more, present inventors have realized that the method disclosed herein is not restricted to rounding and filleting and can be generalized. It can be used to solve a much wider class of problems. The abstract scope where the graph disconnection algorithm can be applied is defined as follows. The application problem is described by a graph. Arcs of the graph are labeled A or B. The state of the art provides a technology A to solve the problem symbolized by a graph with A-labeled arcs only and a technology B to solve the problem symbolized by a graph with B-labeled arcs only. But the current technology is unable to solve the problem symbolized by a graph mixing A-labeled arcs and B-labeled arcs: the AB-technology is missing. Clearly, the graph disconnection provides an alternate sequence of homogeneous (A arcs only or B arcs only) sub graphs so that the initial problem can be solved using an alternate sequence of A-technology and B-technology. Furthermore, only heterogeneous (mixed A arcs and B arcs) sub graphs that the algorithm cannot split deserve the missing AB-technology. In other words, either the AB-technology is unnecessary because all sub graphs are homogeneous, or the AB-technology is designed and implemented on the smallest possible problems symbolized by the smallest heterogeneous sub graphs. Furthermore, the graph disconnection algorithm can imbed some application know how to keep control on disconnection.

Accordingly, the present invention may be directed to design of implementation of two distinct technologies for processing features connecting elements a model, in place of design of edges connecting faces of a modeled object.

The invention claimed is:

1. A method of computer-aided design of edges connecting faces of a modeled object, the method comprising a step of:
   determining with a processor a structure of subsets of faces and edges of convex type or concave type, by iteratively disconnecting faces connected by edges of one of said convex type or concave type from a parent subset, whereby said parent subset is decomposed into child subsets of either:
   a non-connected face; or
   (1) a single connected component of faces connected by edges of the other of said convex type or concave type and (2), in addition to the single connected component, edges of said one of said convex type or concave type that connect the faces within said single connected component,
   wherein said one of said convex type or concave type of edges is a type of edge associated with said parent subset,
   wherein said one of said convex type or concave type of edges is further alternated at each iteration of disconnecting; and
   the method further comprising a step of:
   processing the structure from a given parent subset for rounding or filleting the one or more edges connecting between child subsets thereof, according to the type of edge associated with said given parent subset.

2. The method of claim 1, wherein the step of processing the structure comprises a first-depth scan for processing the structure from said given parent subset.

3. The method of claim 1, wherein the method comprises, prior to said step of determining the structure, a step of:
   determining a graph having nodes representing said faces and arcs representing said edges,
   and wherein at said step of determining the structure, iterative disconnection is performed by iteratively disconnecting said graph into sub-graphs corresponding to respective child subsets in the structure.

4. The method of claim 3, wherein the step of determining said graph further comprises collapsing several nodes into a single node, prior or during disconnection,
   wherein the collapsed nodes represent:
   adjacent faces connected by a smooth edge;
   faces surrounding a singular vertex; or
   faces linked according to predefined geometrical criteria, possibly user-defined.

5. The method of claim 3, further comprising, after the step of determining the graph and prior to determining the structure, a step of:
   cut-node separation of the graph determined, resulting in two graphs,
   and wherein said two graphs are handled separately at the step of determining the structure.

6. The method of claim 3, wherein at the step of determining the structure, coupled arcs are taken into account so that they are not separated in different sub-graphs.

7. The method of claim 1, further comprising, prior to said step of determining the structure, a step of:
   receiving user-selection of a subset of edges and/or faces, and wherein the step of determining the structure begins at a parent subset reflecting said user-selection.

8. The method of claim 1, wherein the step of processing the structure comprises:
   displaying to a user said one or more edges connecting child subsets of said given parent subset;
   receiving user-edition of a displayed edges;
   processing together said one or more edges, taking into account said user-edition.

9. The method of claim 1, wherein at said step of determining the structure, the structure determined is a tree structure capturing a decomposition of said subsets.

10. The method of claim 9, wherein at said step of determining the structure, iterative disconnection is performed twice to generate a plurality of tree structures, by beginning with both one of said convex or concave type of edges, and the other type of edges, and wherein the method further comprises a step of: retaining the flattest tree structure amongst the plurality of tree structures.

11. A method of computer-aided design of implementation of two distinct technologies for processing features connecting elements of a model, the method comprising a step of:
   determining with a processor a structure of subsets of elements and features of a first type or a second type, by iteratively disconnecting elements connected by features of one of the first or second type from a parent subset, whereby said parent subset is decomposed into child subsets of either:
   a non-connected element; or
   (1) a single connected component of elements connected by features of the other of said first or second type and (2), in addition to the single connected component, features of said one of the first or second type that connect the elements within said single connected component,
   wherein features of said one of said first or second type is a type of features associated with said parent subset;
   wherein said the type of features is further alternated at each iteration of disconnecting; and
   the method further comprising steps of:
   processing the structure from a given parent subset for implementing a first or a second technology for processing one or more features connecting between child subsets of said parent subset, according to the type of features associated with said given parent subset; and
   implementing, concomitant with or subsequent to the step of processing the structure, said first and second technologies according to a result of the step of processing the structure.

12. A computer program product, stored on a non-transitory computer-readable storage medium, for computer-aided design of edges connecting faces of a modeled object, comprising code means adapted for:
   determining a structure of subsets of faces and edges of convex type or concave type, by iteratively disconnecting faces connected by edges of one of said convex type or concave type from a parent subset, whereby said parent subset is decomposed into child subsets of either:
   a non-connected face; or
   (1) a single connected component of faces connected by edges of the other of said convex type or concave type and (2), in addition to the single connected component, edges of said one of said convex type or concave type that connect the faces within said single connected component,
   wherein said one of said convex type or concave type of edges is a type of edge associated with said parent subset;
   wherein said one of said convex type or concave type of edges is further alternated at each iteration of disconnecting; and
   processing the structure from a given parent subset for rounding or filleting the one or more edges connecting between child subsets thereof, according to the type of edge associated with said given parent subset.

13. A computerized system comprising
means adapted for:
   determining a structure of subsets of faces and edges of convex type or concave type, by iteratively disconnecting faces connected by edges of one of said convex type or concave type from a parent subset, whereby said parent subset is decomposed into child subsets of either:
   a non-connected face; or
   (a) a single connected component of faces connected by edges of the other of said convex type or concave type and (2), in addition to the single connected component, edges of said one of said convex type or concave type that connect the faces within said single connected component,
   wherein said one of said convex type or concave type of edges is a type of edge associated with said parent subset;
   wherein said one of said convex type or concave type of edges is further alternated at each iteration of disconnecting; and
means adapted for:
   processing the structure from a given parent subset for rounding or filleting the one or more edges connecting between child subsets thereof, according to the type of edge associated with said given parent subset.

14. A computer program product, stored on a non-transitory computer-readable storage medium, for computer-aided design of edges connecting faces of a modeled object, comprising code means adapted for:
   determining a structure of subsets of elements and features of a first type or a second type, by iteratively disconnecting elements connected by features of one of the first or second type from a parent subset, whereby said parent subset is decomposed into child subsets of either:
   a non-connected element; or
   (1) a single connected component of elements connected by features of the other of said first or second type (2) and, in addition to the single connected component, features of said one of the first or second type that connect the elements within said single connected component,
   wherein features of said one of said first or second type is a type of features associated with said parent subset;
   wherein said the type of features is further alternated at each iteration of disconnecting; and
   processing the structure from a given parent subset for implementing a first or a second technology for processing one or more features connecting between child subsets of said parent subset, according to the type of features associated with said given parent subset; and
   implementing, concomitant with or subsequent to the step of processing the structure, said first and second technologies according to a result of the step of processing the structure.

15. A computerized system comprising
means adapted for:
determining a structure of subsets of elements and features of a first type or a second type, by iteratively disconnecting elements connected by features of one of the first or second type from a parent subset, whereby said parent subset is decomposed into child subsets of either:
a non-connected element; or
(1) a single connected component of elements connected by features of the other of said first or second type and (2), in addition to the single connected component, features of said one of the first or second type that connect the elements within said single connected component,
wherein features of said one of said first or second type is a type of features associated with said parent subset;
wherein said the type of features is further alternated at each iteration of disconnecting;
means adapted for:
processing the structure from a given parent subset for implementing a first or a second technology for processing one or more features connecting between child subsets of said parent subset, according to the type of features associated with said given parent subset; and
means adapted for:
implementing, concomitant with or subsequent to the step of processing the structure, said first and second technologies according to a result of the step of processing the structure.

* * * * *